United States Patent [19]

Engel

[11] 3,968,282

[45] July 6, 1976

[54] PRESSURE PAD OF RUBBER OR RUBBER-LIKE MATERIALS FOR PRESSES

[75] Inventor: Horst Engel, Sarstedt, Germany

[73] Assignee: Continental Gummi-Werke Aktiengesellschaft, Hannover, Germany

[22] Filed: Dec. 16, 1974

[21] Appl. No.: 533,240

[30] Foreign Application Priority Data

Dec. 18, 1973 Germany ............................ 2362903

[52] U.S. Cl. ................................ 428/156; 100/211; 428/192; 428/492

[51] Int. Cl.² ......................... B32B 3/00; B30B 5/02

[58] Field of Search ........... 428/174, 492, 156, 192; 100/211; 425/389, 417

[56] References Cited

UNITED STATES PATENTS

| | | | |
|---|---|---|---|
| 2,575,734 | 11/1951 | Schulman | 100/211 |
| 3,284,858 | 11/1966 | Taccone | 100/211 |
| 3,292,343 | 12/1966 | Schroeder et al. | 100/211 |
| 3,528,480 | 9/1970 | Smith et al. | 100/211 |
| 3,664,799 | 5/1972 | Wallick, Jr. et al. | 425/389 |

FOREIGN PATENTS OR APPLICATIONS

| | | | |
|---|---|---|---|
| 1,496,258 | 9/1967 | France | 100/211 |

*Primary Examiner*—Marion E. McCamish
*Assistant Examiner*—P. J. Thibodeau
*Attorney, Agent, or Firm*—Walter Becker

[57] ABSTRACT

A pressure pad of rubber or rubber like synthetic material with a marginal rim portion connected to the remaining portion of the pad by a cross sectionally arc-shaped portion and adapted sealingly to engage a rigid holding element connectable to a press, said cross sectionally arc-shaped portion being provided with a slightly reduced wall section, e.g. in the form of a groove.

3 Claims, 2 Drawing Figures

PRESSURE PAD OF RUBBER OR RUBBER-LIKE MATERIALS FOR PRESSES

The present invention relates to a pressure pad of rubber or rubber-like materials for presses which pad is provided with an edge sealingly inserted in rigid holding elements of the press and is angled off by means of an arc-shaped curved thickened cross sectional part.

For purposes of deep drawing open and primarily flat oriented formed articles or for purposes of deep drawing thin-walled pressed parts of sheet metal, frequently presses are employed which are actuated by hydraulic or other pressure means and in which the normally provided movable ram is replaced by an elastically deformable pressure pad. The pressure pad which is in most instances produced without reinforcing inserts of elastomeric materials and sometimes is provided with a relatively thin soft rubber cover or layer is lowered onto the mold containing only the raw part to be pressed in order by a subsequent application of pressure with a simultaneous deformation of the raw part to be expanded into the hollow space of the mold. Since the diaphragm-like pressure pad tends to adapt itself to all irregularities of the hollow space or chamber in the mold, it is possible true to desired dimensions to produce formed articles in a substantially shock-free and practically noiseless operation. The drawback of this method, however, consists in the relatively short lifespan of the pressure pad. The bending deformations of the wall of the pad due to the influence of high inner pressures, especially in the area where the movable pressure surface proper merges with the fixed clamped-in rim, will due to the intensive employment of the presses, already after a relatively short period of operation bring about tears and other fatigue damage which make a premature exchange of the entire pressure pad necessary. In spite of their operational advantages, the heretofore known presses with pressure pads are therefore from an economical standpoint inferior to mechanical and other press types, especially when mass production is involved.

It is, therefore, an object of the present invention to increase the resistance of the deformable pressure pad against occurring stresses and to considerably increase the useful lifespan of the pressure pads to thereby permit presses equipped with such pressure pad to be employed to a considerably greater extent.

These and other objects and advantages of the invention will appear more clearly from the following specification in connection with the accompanying drawing in which.

The pressure pad according to the present invention is characterized primarily in that the arc-shaped curved cross sectional portion of the rim area where the section clamped into the holding member to be connected to the press, merges with the main portion of the pressure pad is provided with a circular reduction in its wall thickness. This reduction need amount to only a few arc degrees over the cross sectional curvature of the rim area of the pressure pad. Advantageously, to this end in the curved cross sectional portion near the clamped-in rim there is provided a circular depression or groove which is open toward the interior of the pressure pad. This groove may have for instance the cross sectional shape of a circular segment, a semicircular surface or a similar geometric surface. The depression is expediently arranged within the region and in the direction of the mean radius of the cross sectional curvature and may have a depth corresponding to a fraction up to one-half of said radius of curvature.

Figure 1:
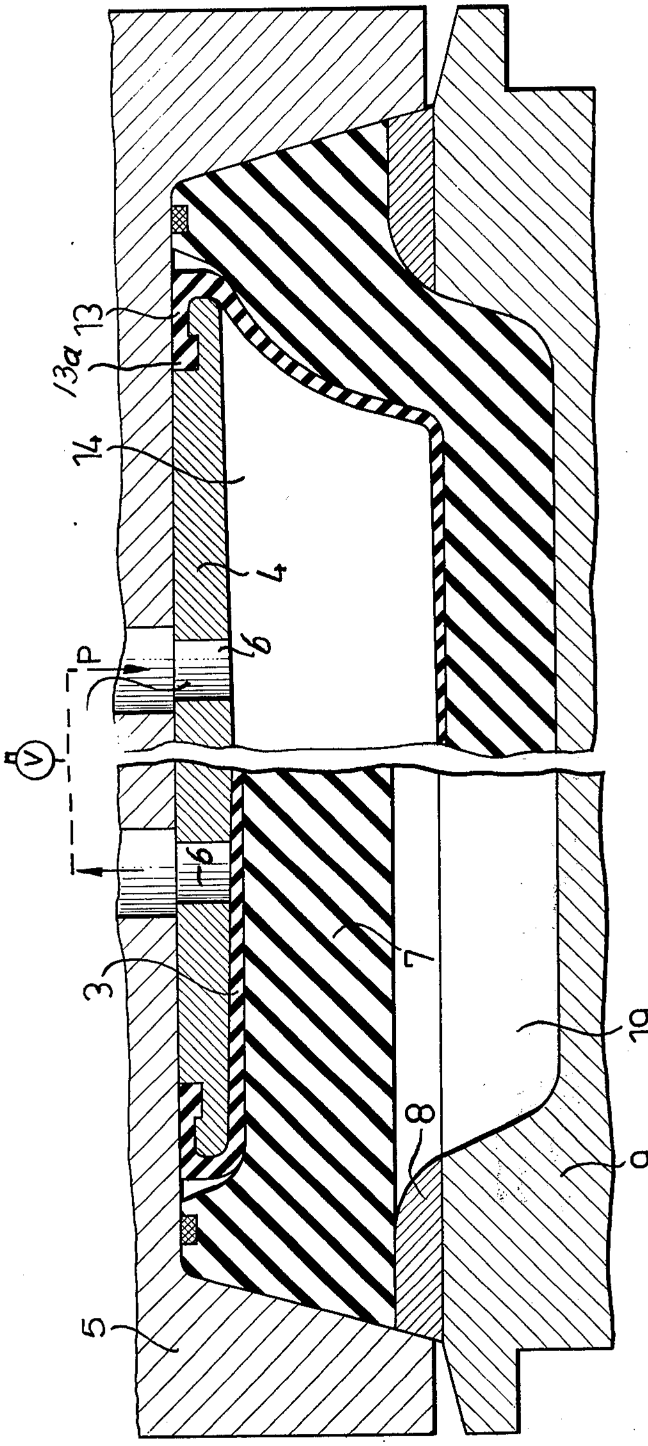
FIG. 1 is a cross section through a pressure pad of the customary design in built-in condition, the lefthand side of FIG. 1 showing the pressure pad in pressure-less condition and the righthand portion showing the pressure pad under pressure.

Referring now to the drawing in detail, the pressure pad 3 shown in FIG. 1 forms the movable molding pressure element of a non-illustrated press. The pressure pad 3 has the shape of a round or rectangular diaphragm, depending on the design and intended employment of the press, with an upwardly bent rim portion 13 angled off by about 180° in a clamping bead 13*a*. The rim portion 13 is by means of a rigid plate 4 connected to the pressure plate 5 of the press in a sealing manner. Through bores 6, the space 14 between the pressure pad 3 and said plate 4 is acted upon by a pressure fluid which may be compressed air or a liquid under pressure. That outer surface of pressure pad 3 which faces away from the space 14 is provided with a soft rubber layer 7 held by an annular disc 8. The soft rubber layer 7 will when the press is in use be in direct contact with the raw article to be formed and is able to enter all details and crevices of the chamber 19 of the open mold 9.

The pressure pad 3 is made of a tough elastic material or of synthetic rubber or similar synthetic material of a corresponding composition. Inasmuch as in all conditions of operation the pressure pad will over its entire outer surface be supported in a pressure resistant manner, no embedding of textile or other strength carriers is necessary in the pressure pad. As will be evident from the lefthand portion of the drawing in FIG. 1, the soft rubber layer 7 will when the chamber 14 communicates through bores 6 with the free atmosphere form an end surface facing the chamber 19 and closing off said chamber 19 together with the raw article to be formed (not shown). By introducing a higher pressure P into the space or chamber 14, the pressure pad with its layer thereon arches out and presses the raw article to be formed into the crevices of the chamber 19 of the mold.

Figure 2:
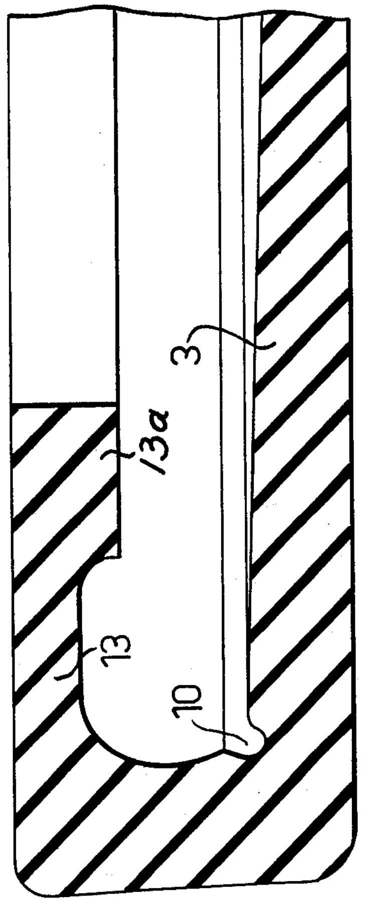
FIG. 2 is a cross section through the marginal edge of a pressure pad according to the invention but on a scale larger than that of FIG. 1.

In the merging zone between the rim section 13 engaging the plate 4 and the movable diaphragm part of the pressure pad, the continuously re-occurring stroke movements in combination with the exertion of pressure, accumulations of tensions occur which form the cause for local brakes of the elastomeric material forming the pad. This danger will be obviated according to FIG. 2 by forming into the pressure pad an open groove or fillet 10 which extends over the entire inner circumference of the pressure pad. The groove or fillet 10 shown in the specific embodiment in the drawing has a semicircular cross section and is provided on the central radius line of the rounding arc surrounding the lower edge of the plate 4. The depth of said groove 10 corresponds only to a fraction of the wall thickness of the pad. Therefore, the said groove or fillet does not result in any reduction of the strength of material but merely effects the desired distribution and elimination of the tension peaks so that a considerably longer lifespan of the pressure pad according to the invention will be realized.

As will be evident from the above, the pressure pad according to the invention is superior to heretofore known designs of pressure pads inasmuch as it greatly improves the staying time of the pressure pad. This is considered to be due to the fact that in the particularly endangered merging zone at the inner mantle of the pressure pad, heretofore occurring local tension peaks are reduced by the circular reduction in the wall thickness, and notching effects with fatigue breaks resulting therefrom will be prevented. Inasmuch as the pressure pad is as a rule designed as a formed article or is composed while using an extruded rim strip, the new design can be realized by a simple change in the present molds or the mouth pieces of the extrusion presses. The cross sectional shape and the dimensions in the specific instance that the depression 10 is formed as a groove or fillet, are preferably to be selected within the region of the clamping or preferred bending zones, especially in view of the above mentioned action and relative to the dimensions and forms, especially the course of the curvature of the walls of the pads.

It is, of course, to be understood that the present invention is, by no means, limited to the specific showing in the drawing but also comprises any modifications within the scope of the appended claims.

What I claim is:

1. An elastic pressure pad of elastomeric material having in combination a marginal curved section with a radially inwardly directed annular connecting flange for sealing engagement with a rim portion of a rigid holding member for a press, said marginal curved section being provided with circular recess means having a relatively shallow depth so as not materially to weaken the wall thickness of said curved section, said recess means forming a fillet, said recess means being arranged within the region and in the direction of the medium radius of said curved section.

2. A pressure pad in combination according to claim 1, in which said recess means has a circle segment-shaped cross section.

3. A pressure pad in combination according to claim 1, in which the depth of said recess means amounts to from a fraction of to half of the radius of curvature of said marginal curved section.

* * * * *